United States Patent [19]

Sato et al.

[11] Patent Number: 4,541,145

[45] Date of Patent: Sep. 17, 1985

[54] DEVICE FOR CLAMPING THE SPLIT PORTION OF A SPLIT HEAT-SHRINKABLE SLEEVE

[75] Inventors: Mitomu Sato; Toshikazu Nakatani; Katsumi Yamashita; Terumi Ogata, all of Kanagawa, Japan

[73] Assignee: Sumitomo Electric Industries, Ltd., Osaka, Japan

[21] Appl. No.: 555,929

[22] Filed: Nov. 29, 1983

[30] Foreign Application Priority Data

Nov. 29, 1982 [JP] Japan .................... 57-181399[U]

[51] Int. Cl.⁴ .................. B65D 63/02; F16L 39/00
[52] U.S. Cl. ...................................... 24/19; 24/20 EE; 24/24; 285/318; 285/419
[58] Field of Search .............. 24/19, 17 AP, 21, 24, 24/279, 284, 20 R, 20 TT, 20 EE, 20 S, 20 CW, 16 R, 30.5 R, 484; 285/373, 381, 419; 138/171

[56] References Cited

U.S. PATENT DOCUMENTS

| 458,415 | 8/1891 | Covert | 24/19 |
|---|---|---|---|
| 565,698 | 8/1896 | Sparks | 285/419 |
| 899,612 | 9/1908 | Phillips | 24/30.5 R |
| 1,032,078 | 7/1912 | Osborn | 24/20 EE |
| 1,235,680 | 8/1917 | Greco | 24/19 |
| 1,369,913 | 3/1921 | Brunhoff | 285/373 |
| 2,599,882 | 6/1952 | Adams | 24/284 |
| 4,109,351 | 8/1978 | Coffey | 24/30.5 R |
| 4,241,119 | 12/1980 | Smart | 285/381 |
| 4,396,656 | 8/1983 | Still et al. | 285/381 |

Primary Examiner—Victor N. Sakran
Attorney, Agent, or Firm—Sughrue, Mion, Zinn, Macpeak & Seas

[57] ABSTRACT

A clamping device for clamping a split heat-shrinkable sleeve placed around the joint between the core conductors of two communication cables which are to be joined or spliced together. The sleeve has two upstanding lugs or flanges on either side of the split in the sleeve. The holding strips are placed against the outer surface of the lugs. Each strip consists of two foldable link assemblies joined to opposite ends of a straight, rigid center portion or line. A connecting rod is initially inserted through sleeves on each strip to keep the strip straight during placement against the lugs. Clamping springs are rotatably mounted on one strip, and, after placement of the strip, the springs are rotated over both strips, thereby forcing the lugs into contact with each other. The rods are then removed. When the split sleeve shrinks upon the application of heat thereto, the link assemblies fold or pivot to accomodate the resulting deformation of the sleeve, whereby the strips and springs continue clamping the lugs together until the sleeve completes its shrinkage.

2 Claims, 10 Drawing Figures

DEVICE FOR CLAMPING THE SPLIT PORTION OF A SPLIT HEAT-SHRINKABLE SLEEVE

BACKGROUND OF THE INVENTION

1. Field of the Invention

This invention relates to a device for clamping the split portion of a split heat-shrinkable sleeve which is used for covering the joint between the core wires in a communication cable.

2. Description of the Prior Art

When communication cables are joined together, the joint between their core wires is covered by a split heat-shrinkable sleeve.

A split heat-shrinkable sleeve is shown at 1 in FIGS. 1 and 2. It comprises a cylindrical body 3 formed from a heat-shrinkable synthetic resin, and lined with a layer 2 of polyamide, or the like. The cylindrical body 3 has a longitudinally extending split portion. A pair of longitudinally extending lugs or flanges 4 project outwardly from the edges of the split portion. One of the edges of the split portion has a tongue 5 which closes the split portion.

A pair of L-shaped clamping members 7 has hitherto been used for clamping the lugs 4 when the sleeve 1 is heated for shrinkage. Each lug 4 has a plurality of eyelet holes 6 spaced apart from one another by a distance of about 10 to 15 mm along its length, as shown in FIG. 1. Each L-shaped clamping member 7 has a plurality of elongated holes 8 (FIG. 3) which are alignable with the holes 6 of the lugs 4. An eyelet 9 is inserted in each aligned combination of holes 6 and 8 to hold the lugs 4 and the L-shaped members 7 together, as shown in FIG. 2. The eyelets 9 are squeezed and deformed by compression by a pair of pinchers 10 to force-fit the eyelets in the holes and, thus, clamp the lugs 4 together, as shown in FIG. 2.

The method as hereinabove described is very troublesome and inefficient, since a multiplicity of eyelets 9 must be squeezed and deformed by the pinchers 10, one by one.

The method is expensive, since it requires the L-shaped members, the eyelets and the pinchers, and since the L-shaped members and the eyelets are thrown away after the necessary work has been done. As the method does not employ any means for urging the opposing lugs against each other, it is difficult to ensure the intimate contact of the lugs when they have shrunk by heat. This results in the failure to achieve complete airtightness in the split portion.

A high degree of accuracy is required for the manufacture of the sleeve, since the eyelet holes 6 of the lugs 4 must be correctly spaced apart from one another so that they may be properly aligned with the elongated holes 8 of the L-shaped members 7. The sleeve is expensive to manufacture, since extra work is required for making the eyelet holes.

SUMMARY OF THE INVENTION

This invention has been made to overcome the problems hereinabove pointed out. It is an object of this invention to provide a device which can clamp the lugs of a split heat-shrinkable sleeve firmly and efficiently, and which contributes to reducing the costs of clamping and of manufacturing the sleeve.

The device of this invention comprises a pair of longitudinally extending holding strips disposed along the outsides of the lugs, and a multiplicity of springs attached rotatably to one of the holding strips and spaced apart from one another along the length of the strip, the springs being engageable over the strips to hold the strips resiliently against the lugs, thereby urging the lugs against each other.

DETAILED DESCRIPTION OF THE PREFERRED EMBODIMENT

Figure 1:
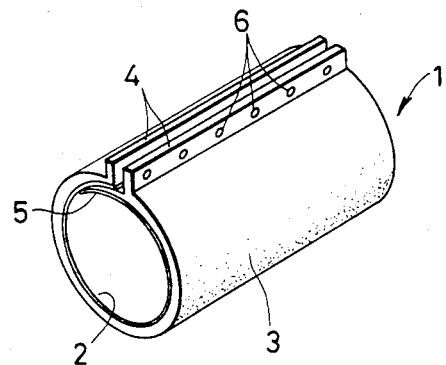
FIG. 1 is a perspective view of a conventional heat-shrinkable sleeve.
Figure 2:
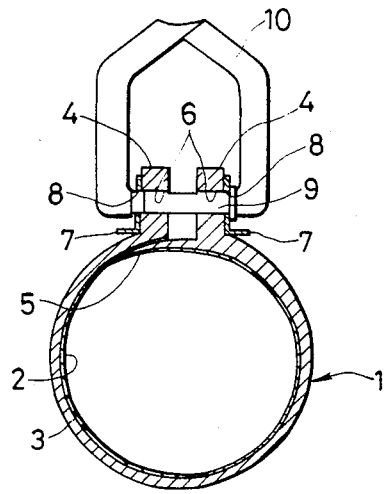
FIG. 2 is a cross sectional view showing the conventional method for fixing the lugs.
Figure 3:
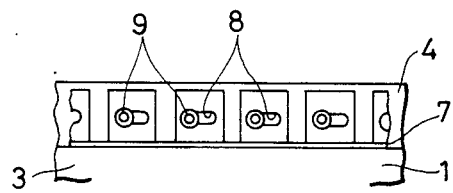
FIG. 3 is a front elevational view corresponding to FIG. 2.

The invention will now be described with reference to FIGS. 4 to 10 of the accompanying drawings.

A clamping device embodying this invention comprises a pair of longitudinally extending holding strips 11 and 12 which are disposed along the outsides of the two lugs 4 of a split heat-shrinkable synthetic resin sleeve 1, and a multiplicity of springs 13 attached at certain intervals to one holding strip 11. Connecting rods 14a and 14b are provided for the holding strips 11 and 12, respectively.

The holding strips 11 and 12 are essentially identical in construction, and each comprises a middle portion 15 and two link assemblies 16 connected to opposite ends of the middle portion 15. Each link combination 16 comprises a plurality of links 16a each of which is bifurcated at both ends, and a plurality of links 16b each having at each end a projection engaged in the bifurcated end of an adjoining link 16a. Each end of the middle portion 15 also has a projection. Adjacent bifurcated ends and projections are rotatably joined to each other by a pin 16c. Therefore, the links 16a and 16b are foldable relative to each other, and the links 16a adjacent middle portion 15 are foldable relative thereto.

The holding strip 11 further includes a plurality of spring mounting sleeves 17, and a plurality of sleeves 18 in which the connecting rod 14a is removably inserted. The sleeves 17 and 18 are each aligned in a line extending along the middle portion 15 and the link assemblies 16. The sleeves 17 and 18 in the link assemblies 16 are fixed to the bifurcated links 16a. The sleeves 17, as well as the sleeves 18, are spaced equidistantly apart.

The other holding strip 12 is provided adjacent to its lower end with a plurality of sleeves 19 in which the connecting rod 14b is removably inserted, and which are aligned in a line extending along the outside of the strip 12. The sleeves 19 are fixed on the links 16a and along the length of the middle portion 15, and are spaced equidistantly apart.

The link assembly 16 at each end of each of the holding strips 11 and 12 is held in an unfolded straight line extending longitudinally of the middle portion 15 by the connecting rods 14a and 14b inserted in the sleeves 18 and 19, respectively.

Figure 6:
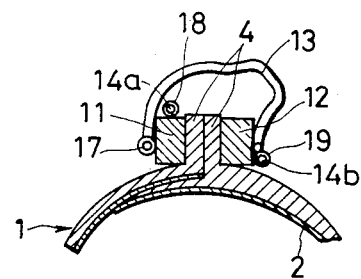
FIG. 6 is a fragmentary enlarged cross sectional view corresponding to FIG. 5.
Figure 7:
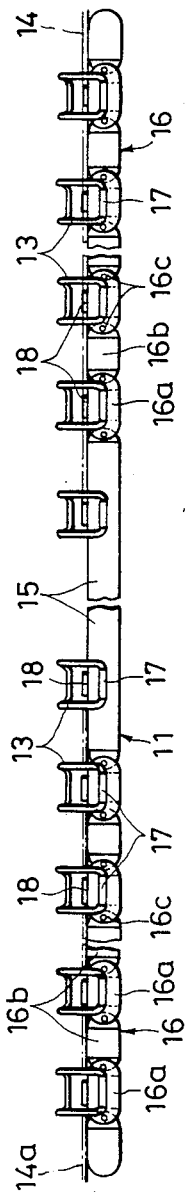
FIG. 7 is an enlarged front elevational view of one of the holding strips.
Figure 8:
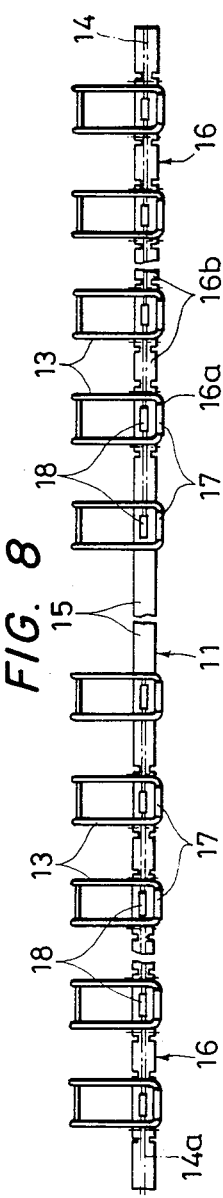
FIG. 8 is a top plan view of the holding strip shown in FIG. 7.
Figure 9:
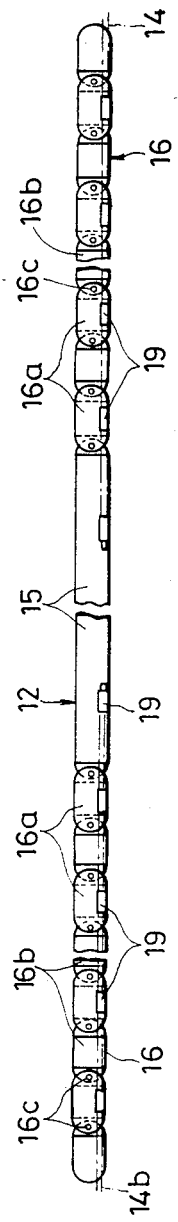
FIG. 9 is an enlarged front elevational view of the other holding strip.
Figure 10:
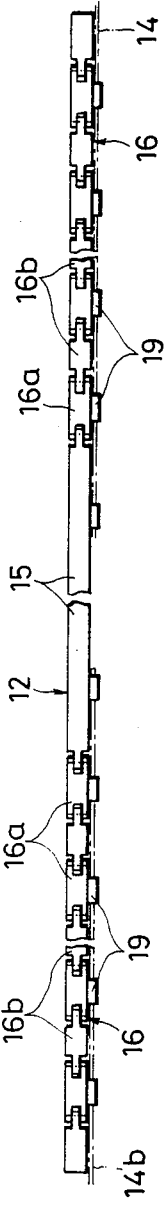
FIG. 10 is a top plan view of the holding strip shown in FIG. 9.

Each spring 13 comprises a curved metal wire having one end pivotally fastened to one of the sleeves 17 on the holding strip 11, and is rotatable about the sleeve 17. The springs 13 are resiliently engaged about the holding strips 11 and 12, and have a generally channel-shaped configuration as shown in FIG. 6.

When the lugs 4 are held together by the springs 13, the sleeves 19 on the holding strip 12 serve as stop members for the free ends of the springs 13.

The fixing or clamping device of this invention as hereinabove described is used in a manner hereinafter described.

Figure 4:
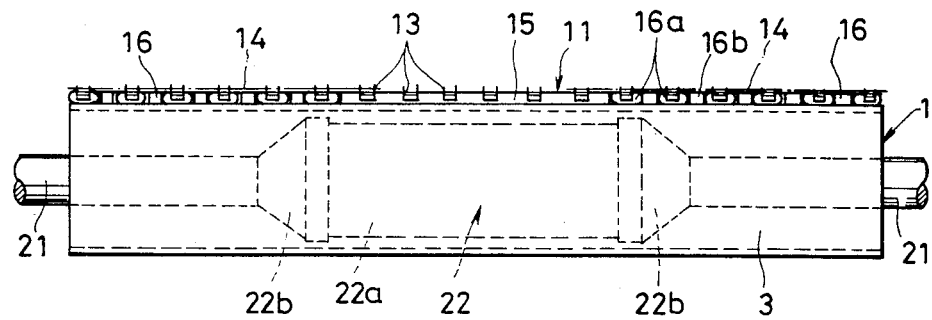
FIG. 4 is a front elevational view showing the mode of use of a fixing device embodying this invention.
Figure 5:
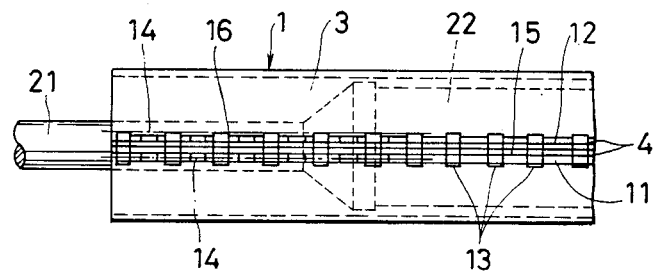
FIG. 5 is a top plan view corresponding to FIG. 4.

If the core conductors or wires of cables 21 are joined or spliced together, and a barrier-reducer 22 is attached to the joint in preparation for an outer covering connection, the sleeve 1 is placed about the joint, as shown in FIGS. 4 and 5.

The holding strips 11 and 12, held in a straight form by the rods 14a and 14b are placed on the outer sides of the lugs 4 which are held in contact with each other. The holding strips 11 and 12 are held by one hand, and the springs 13 are rotated upwardly about the holding strip 11 and engaged over the holding strips 11 and 12 by the other hand, as shown in FIG. 6, whereby the lugs 4 are clamped together along their entire length, as shown in FIG. 4.

Then, the connecting rods 14a and 14b are removed to render the link assemblies 16 foldable, and the sleeve 1 is heated for shrinkage.

When the sleeve 1 is heated, the lugs 4 are kept in intimate contact with each other by the springs 13, and the contacting surfaces of the lugs 4 are fused together by the heat which the holding strips 11 and 12 contain as a result of preheating.

The elongated middle portions 15 of the holding strips 11 and 12 extend along the length of the middle metal barrier portion 22a of barrier-reducer 22, and the link assemblies 16 extend along the conical rubber reducer portions 22b and the cables 21. Therefore, even if the middle and end portions of the sleeve 1 have shrunk in different ways, the link assemblies 16 are foldable, like a bicycle chain, to adapt themselves to any diametrical deformation of the sleeve which occurs as the sleeve is heated to reduce its diameter to approximately that of the cables 21, and, thereby, continue holding the lugs 4 firmly until the sleeve completes its shrinkage.

Then, the sleeve 1 is allowed to cool, or cooled by water if a reduction in working time is desired. The springs 13 are rotated away from the holding strips 11 and 12, and the holding strips 11 and 12 are removed.

A number of tests were conducted on the heat-shrinkable sleeve produced by using the fixing device of this invention. The results will hereinafter be set forth.

(1) Heat Cycle Test

A heat cycle test was conducted by applying a gas pressure of 0.4 kg/cm² to the joint and employing a heat cycle: $-20°$ C. (two hours)—room temperature (two hours)—$+60°$ C. (two hours—room temperature (two hours). The heat cycle was repeated one hundred times, and the test showed satisfactory results.

(2) Vibration Test

The joint was vibrated $10^6$ times at an amplitude of ±5 mm and a frequency of 10 Hz. Nothing abnormal was found.

(3) High Temperature Test

The joint was immersed in hot water having a temperature of 60° C. for 30 days. No gas leakage was found.

(4) Working Time

While the conventional method using the eyelets required two persons and an average time of 15 to 20 minutes for fixing the lugs, the device of this invention required only one person and a work time of only one or two minutes.

The advantages of the device recording to this invention can be summarized, as follows:

(1) As the device comprises a pair of longitudinally extending holding strips disposed along the outer sides of the two lugs of a split heat-shrinkable sleeve, and a multiplicity of springs attached rotatably to one of the holding strips and engageable about the holding strips resiliently to hold them against the lugs, the lugs can be clamped together merely by moving the springs over the holding strips which are being held together. The work requires only one person and a very short time.

(2) The lugs can be firmly secured to each other, as they are clamped along their entire lengths by the springs.

(3) The lugs can be held in a substantially straight line, as they are resiliently clamped on both sides thereof. This ensures the realization of a uniformly shrunken shape, irrespective of the skill of the person applying the heat required for shrinking the sleeve.

(4) As the lugs are clamped by a pair of holding strips and springs, no eyelet holes need be formed in the lugs. This means a reduction in the work required for the manufacture of the sleeve and, therefore, enables the manufacture of the sleeve at a lower cost.

(5) The device comprising a pair of holding strips and springs is easily removable from the lugs for reuse. This brings about a drastic reduction in the cost of equipment for fixing the lugs.

(6) The lugs can be firmly held together by virtue of the force of the springs. The holding strips can be preheated. This enables the fusing or bonding together of the lugs, and the manufacture of a thermally shrunk product which is excellent in heat and vibration resistance.

We claim:

1. A device for clamping the split portion of a split heatshrinkable sleeve, said split portion having a pair of upstanding, longitudinally extending lugs; said device comprising a pair of longitudinally extending holding strip means for holding said lugs therebetween; and a plurality of spring means rotatably attached to one of said holding strip means and spaced apart from one another along the length of said one holding strip means, said spring means being engagable over both of said strip means for holding both of said strip means resiliently against said lugs and for clamping said lugs together, each of said holding strip means being foldable and comprising link assembly means comprising a plurality of pivotally connected links; sleeve means on some of said links for receiving a connecting rod means; and removable connecting rod means insertable in said sleeve means for holding said strip means in a straight, unfolded condition.

2. A device for clamping the split portion of a split heatshrinkable sleeve, said split portion having a pair of upstanding, longitudinally extending lugs; said device comprising a pair of longitudinally extending holding strip means for holding said lugs therebetween; and a plurality of spring means rotatably attached to one of said holding strip means and spaced apart from one another along the length of said one holding strip means, said spring means being engagable over both of said strip means for holding both of said strip means resiliently against said lugs and for clamping said lugs together, each of said holding strip means comprising a straight, rigid middle portion; and a foldable portion comprising two link assemblies, said middle portion being connected between said link assemblies, each holding strip means comprising a plurality of sleeve means fixed to said two link assemblies and to said middle portion, and removable connecting rod means insertable in said sleeve means for holding said strip means in a straight, unfolded condition.

* * * * *